(12) United States Patent
Hanlon

(10) Patent No.: US 8,708,347 B1
(45) Date of Patent: Apr. 29, 2014

(54) MULTI-SECTION VEHICLE CHASSIS ACCESS AND INSPECTION PLATFORM

(75) Inventor: Jared W. Hanlon, Santa Clarita, CA (US)

(73) Assignee: Kai Hsiang Traffic Appliances Co. Ltd. (TW)

( * ) Notice: Subject to any disclaimer, the term of this patent is extended or adjusted under 35 U.S.C. 154(b) by 0 days.

(21) Appl. No.: 13/348,244

(22) Filed: Jan. 11, 2012

(51) Int. Cl.
*B62B 11/00* (2006.01)

(52) U.S. Cl.
USPC .................................. 280/32.6; 280/32.5

(58) Field of Classification Search
USPC ......... 280/656, 37, 32.6, 32.5, 655, 651, 255, 280/42
See application file for complete search history.

(56) References Cited

U.S. PATENT DOCUMENTS

| | | | | |
|---|---|---|---|---|
| 781,243 | A * | 1/1905 | Thompson | 280/651 |
| 3,430,982 | A * | 3/1969 | Despain et al. | 280/255 |
| 4,637,626 | A * | 1/1987 | Foss et al. | 280/655 |
| 4,878,682 | A * | 11/1989 | Lee | 280/42 |
| 5,340,134 | A * | 8/1994 | Dodson | 280/37 |
| 6,585,285 | B2 * | 7/2003 | Koch | 280/656 |
| 6,773,025 | B1 * | 8/2004 | Zelm | 280/656 |
| 6,871,861 | B2 * | 3/2005 | Hernandez, Jr. | 280/32.6 |
| 7,097,182 | B1 * | 8/2006 | Liu | 280/42 |
| 7,481,438 | B2 * | 1/2009 | Hernandez | 280/32.6 |
| 7,731,221 | B2 * | 6/2010 | Bess | 280/651 |

* cited by examiner

*Primary Examiner* — Hau Phan
(74) *Attorney, Agent, or Firm* — Cherskov Flaynik & Gurda, LLC

(57) ABSTRACT

A vehicle chassis inspection platform, or creeper, comprising a frame, a cushion layer, and several wheel assemblies is disclosed. The creeper includes a wheel assembly designed to minimize vertical clearance of the creeper wherein the wheel assembly includes a wheel platform with multiple possible positions for joining of the wheel platform to the creeper.

12 Claims, 4 Drawing Sheets

MULTI-SECTION VEHICLE CHASSIS ACCESS AND INSPECTION PLATFORM

BACKGROUND OF THE INVENTION

1. Field of the Invention

The present invention relates generally to a moveable platform facilitating access and inspection of vehicle chassis. Specifically, the platform comprises a main body and a series of removably attached wheel supports.

2. Background of the Invention

Inspection of a vehicle chassis is generally a two step process.

First, the space between the vehicle and the ground on which the vehicle stands must be increased, such that the vertical clearance is sufficient to allow a person to access the chassis from all angles. While through hydraulic or other means it is possible to lift the vehicle many feet off the ground, such high lifting requires specialized equipment and creates safety issues as well as other problems. For instance, while light passenger vehicles can be lifted with standard equipment, heavier passenger vehicles and commercial or industrial vehicles require complex and expensive lifting equipment in order to be raised sufficiently off the ground to allow personal inspection while standing.

An alternative is to jack up the vehicle by only a few feet, allowing inspection personnel to examine the car while lying on a moveable surface. The inspection of vehicle chassis while in the lying position has numerous benefits and has become the standard method of servicing vehicles. However, for safety and access reasons, the person checking the vehicle will not want to lie directly on the ground where the vehicle is parked. Instead, a support platform is employed. Such support platforms are termed vehicle creepers.

Support platforms must be highly mobile, contain as few elements as possible, and facilitate mobility while decreasing the amount of vertical space the creeper requires. Inasmuch as when the creeper takes more vertical space, less space is available for operating on the vehicle. A creeper that has a high vertical profile would require the car to be lifted higher. Once the car must be lifted more than a few feet, the same specialty lifting equipment must be used that would be required to lift the vehicle to the height of a standing person. As such, poorly designed creepers defeat the benefit on not requiring specialty jacking equipment.

Support platforms are therefore designed to be as low as possible. However, thin platform design approach results in little padding being placed on the user contact surface of the support platform. Given that some vehicle maintenance and inspection tasks require several hours, a thin platform results in considerable discomfort for the user of same. Alternatively, in order to increase the padding on the platform, some support platforms utilize wheels having minimal diameters. While this achieves a minimal vertical footprint, it results in support platforms that are difficult to maneuver over the smallest of obstacles, such as channels in concrete barriers. Small wheels also decrease mobility of the platform when a heavy load is placed thereupon. A support platform without sufficient mobility is self-defeating in most circumstances.

Finally, vehicle inspection support platforms are generally designed to take up as little space as possible while not in use. A narrow design is generally employed in order to minimize the amount of space required for the support platform. While this design limits the surface area of the platform, it has a detrimental effect on the stability of the platform and on the comfort of the user of same.

A need exists in the art for a support platform that features a sufficient amount of surface padding, that employs large casters without increasing the vertical clearance of the support platform, and that does not take up an excessive amount of space at times it is not used.

SUMMARY OF INVENTION

An object of the invention is to provide a device for providing access to a vehicle chassis that overcomes many of the disadvantages of the prior art.

Another object of the invention is to provide access to a vehicle chassis while the vehicle is lifted only a few feet off the ground. A feature of the invention is that it allows for comfortable access to the underside of the vehicle while providing support for the body of the vehicle inspector. An advantage of the invention is that the platform provides access to the vehicle chassis without requiring extensive upward lifting of same.

Still another object of the present invention is to provide a device to provide a padded surface to access a vehicle chassis. A feature of the invention is that it includes a padding layer featuring several area of reversibly deformable support. An advantage of the present invention is that the platform is used for extended periods of time without causing discomfort to the user. Another advantage of the present device is that the padding allows for comfortable use of the platform without adding separate cushions.

Yet another object of the current invention is to provide a platform wherein the padding on the platform will be optimized to not react with the surrounding environment. A feature of the instant invention is that in one embodiment the padding on the platform is removably attached to the platform and is selected to be nonreactive with the environment in which the platform is used. An advantage of the instant invention is that the padding will not be deteriorated by being used in a corrosive environment. A further advantage of the present system is that the padding is removed and cleaned as needed.

Yet another object is to provide a platform which features a minimal vertical profile. A feature of an embodiment of the presently invented system is that the wheels are removably attached to the sides of the platform. An advantage of the present system is that the wheels are positioned in such a way as to limit the heights of the platform.

A further object of the invention is to provide a support platform capable of rolling over irregular terrain. A feature of the invention is that the wheels attached to the sides of the platform extend above the horizontal plane of the platform frame. An advantage of the present invention is that the platform incorporates wheels that are sufficiently large so as to be able to roll over rough surfaces without raising the vertical profile of the platform.

Still another object of the present invention is to provide a large surface area to support a vehicle chassis mechanic and tools. A feature of the present invention is that, in one embodiment, the support platform frame includes a wide section. An advantage of the present system is that the platform is used comfortably for extended periods of time and is used to hold tools and other instruments.

Another object of the present invention is to provide a support platform that is stored while occupying a minimal amount of space. A feature of the present invention is that it incorporates a transverse fold line. An advantage of the present platform is that it allows storage of the support surface in a folded configuration resulting in a lessened physical profile for same.

A yet further object of the present invention is to provide a support platform wherein the wheels of same are replaced depending on the application of the platform. A feature of the invention is that the wheels are attached using removable attachment means. An advantage of the present invention is that different types of wheels are be attached to the platform depending on the application of the platform.

The invention comprises a vehicle chassis access platform, the platform comprising: a frame assembly comprising a first subportion, a second subportion, wherein the first subportion and the second subportion are removably joined together to form the frame assembly; at least three wheel assemblies wherein each wheel assembly comprises a wheel platform; a wheel; a wheel retention bracket; wherein each wheel is connected to a retention bracket and said retention bracket is removably connected to a corresponding wheel platform wherein each wheel assembly is removably attached to the frame; and a cushion layer removably attached to the frame assembly.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
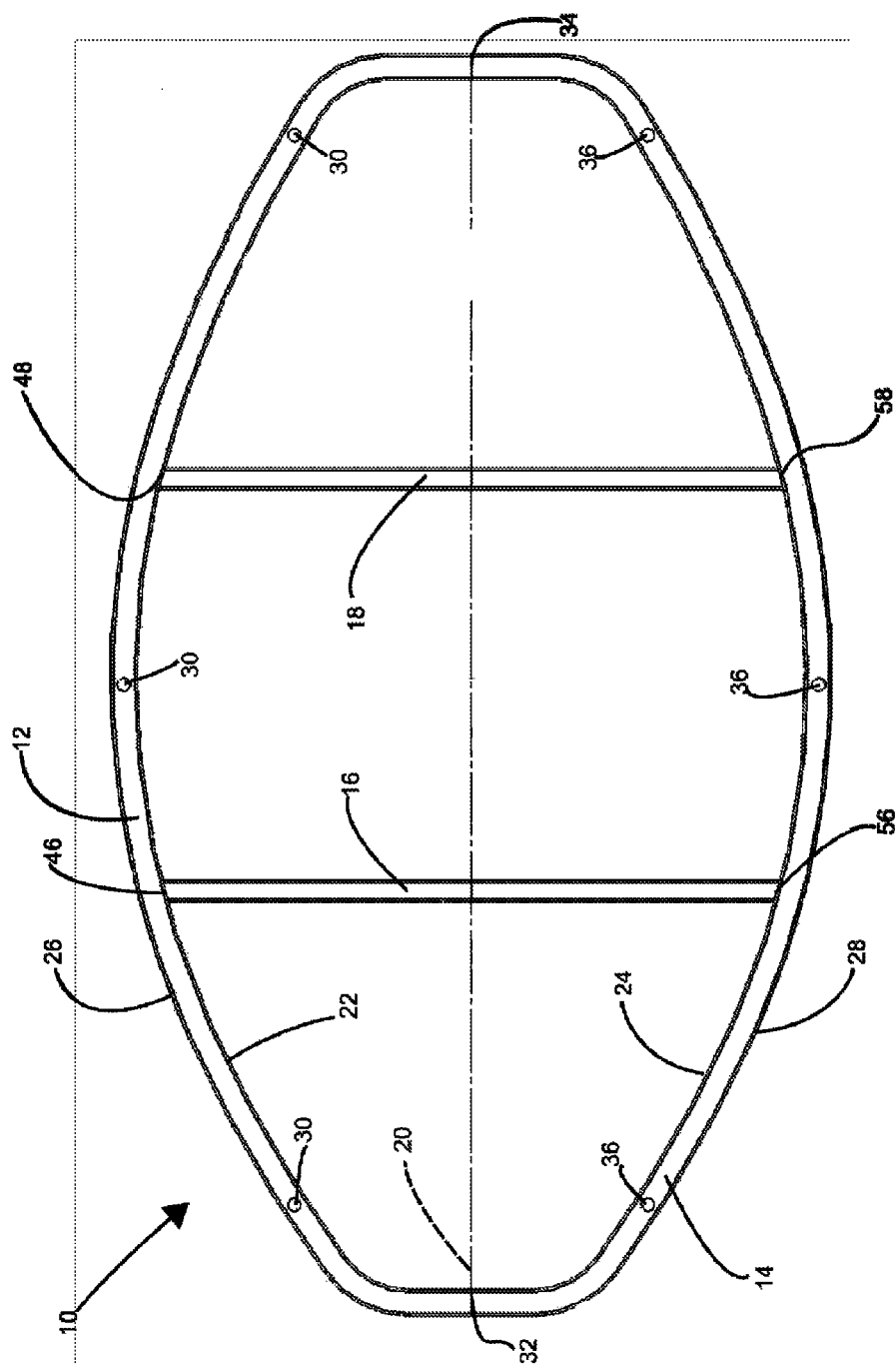
FIG. 1 depicts the schematic of an embodiment of the invention.

The invention is a device and method of accessing a vehicle chassis while in the reclining position. As shown in FIG. 1, one embodiment of the invention comprises a platform 10 which incorporates a first frame subportion 12 and a second frame subportion 14. The first frame subportion 12 and second subportion 14 form a generally oval shape in the embodiment shown in FIG. 1 and are reversibly joined together to form an outer frame of the device 10. In other embodiments, not shown, the outer frame defines a substantially rectangular shape.

In the embodiment shown in FIG. 1, the device 10 incorporates two cross bars—a first cross bar 16 and a second cross bar 18. In one embodiment of the invention, each cross bar is removably mounted to a corresponding subportion. Specifically, the first end 46 of the first cross bar 16 is received by the first subportion 12 while the second end 56 of the first cross bar 16 is received by the second subportion 14. Further, the first end 48 of the second cross bar 18 is received by the first subportion 12, while the second end 58 of the second cross bar 18 is received b the second subportion 14.

In one embodiment of the invention, the cross bars 16 and 18 are removably mounted on the subportions through the use of mounting means such as a hook grip, threaded screw and nut assembly, clamp, gripping pressure, and other methods. In other embodiments, the cross bars are permanently attached to the corresponding subportions through permanent attachment means, such as welding. In other embodiments, the cross bars 16 and 18 are integrally molded to the corresponding subportions 12 and 14.

The first subportion 12 and second subportion 14 meet at two connection points 32 and 34. In the embodiment shown in FIG. 1, the connection points 32 and 34 are found at opposing ends of the first subportion 12 and the second subportion 14. In at least one embodiment, at the connection points 32 and 34, the first subportion 12 and second subportion 14 are connected removably, through subportion connection means, such as a lock, or removable mechanical joints such as dovetail joints. In another embodiment, the first subportion 12 and second subportion 14 are in hingeable communication at connection points 32 and 34. In this embodiment, connection points 32 and 34 incorporate hinges. In some embodiments the hinges are removably lockable through locking means such as a pin. In further embodiments, hinges at connection points 32 and 34 are allowed to move freely. However, the subportions are locked in place by the temporary placement of the first cross bar 16 and the second cross bar 18.

A straight line running from the first connection point 32 to the second connection point 34 forms a transverse fold line 20 through the platform 10. In the embodiment shown in FIG. 1, the first frame subportion 12 is substantially identical to the second frame subportion 14. As such, upon joining the first frame subportion 12 to the second frame subportion 14 at connection points 32 and 34, the resulting frame features a shape wherein each point along the first subportion 12 having a distance x from the transverse fold line 20, has a corresponding point along the second subportion 14 having the same distance x from the transverse fold line 20.

While not shown in FIG. 1, the frame 10 is folded along the transverse fold line 20 in some embodiments. In embodiments where the cross bars 16, 18 are permanently attached the first subsection 12 and the second subsection 14, the cross bars 16, 18 also incorporate lockable hinges substantially at the location where the transverse fold line 20 crosses the cross bars 16, 18. In embodiments where the cross bars 16, 18 are removably attached to the subsections 12, 14, the cross bars are unbending and continuous length of substantially inflexible material, such as steel or fortified aluminum. Such inflexible cross bars 16, 18 are removed prior to the folding of the frame 10.

In a folded configuration, the first subsection 12 and the second subsection 14 are angled together such that substantially each point on the first subsection 12 comes in contact with a corresponding point on the second subsection 14. In one embodiment, the folding of the first subportion 12 is in the direction through the plane formed by the top surface of the first subportion 12. In this embodiment, upon folding the top surface of the first subportion 12 meets the top surface of the second subportion 14. In an alternative embodiment, the folding of the first subportion 12 is in the direction away from the plane formed by the top surface of the first subportion 12. In this embodiment, upon folding the bottom surface of the first subportion 12 meets the bottom surface of the second subportion 14.

In yet further embodiments, the connection points 32 and 34 do not incorporate hinges and the first subportion 12 is not in hingeable communication with the second subportion 14. Instead, the connection points 32 and 34 include removable assembly means, such as combinations of apertures and insertion rods, pressure snaps, or other mechanisms. In this embodiment, the first subportion 12 and the second subportion 14 are removably assembled at connection 32 and 34 and so the frame is disassembled in lieu of being folded as is the case with embodiments featuring folding means.

As shown in FIG. 1, the platform 10 incorporates a large area defined by the inner boundary 22 of the first subportion 12 and the inner boundary 24 of the second subportion 24. The frame 10 is defined by the distance between the inner boundary 22 of the first subportion 12 and the outer boundary 26 of the first subportion 12 as removably combined with the material between the inner boundary 24 of the second subportion 14 and the outer boundary 28 of the second subportion 14. The cross bars 16 and 18 add further bulk to the frame 10, however, the predominant feature of the frame 10 is the absence of supporting material inside of the area defined by the inner boundaries 22 and 24.

The first subportion 12 incorporates a series of first frame subportion apertures 30. In the embodiment shown in FIG. 1, the first frame subportion apertures 30 are substantially equally spaced from one another. Further, as is depicted in the embodiment shown in FIG. 1, the second subportion 14 includes corresponding apertures in the area defined by the inner boundary 24 and the outer boundary 28.

For both the first subportion 12 and the second subportion 14 the apertures 30 and 36 are added in such a manner as not to decrease the structural stability of the corresponding subportion. For instance, the subportion 12 remains sufficiently structurally sound, even at apertures 30, such that it does not bend when a load is applied to the subportion 12. Structural integrity for each subportion is assured by the careful selection of the size of each aperture 30 and 36. The radius of each aperture is not larger than 30% of the length between a subportion inner boundary and subportion outer boundary.

Figure 2:
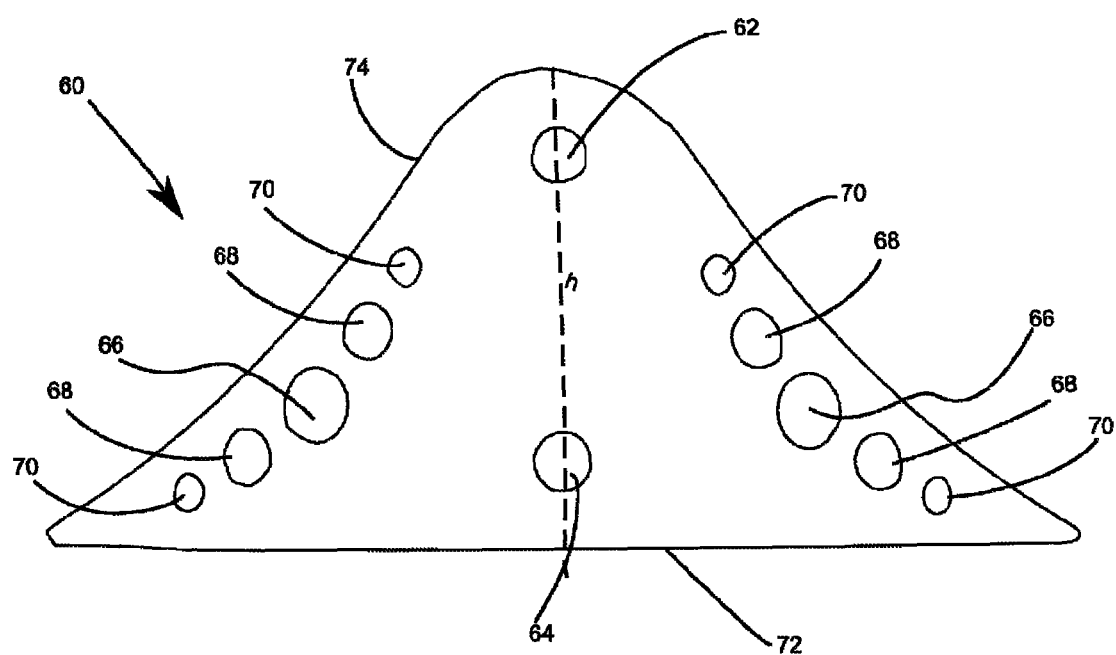
FIG. 2 depicts the wheel platform assembly of one embodiment of the invention.

Each aperture 30, 36 receives a screw, peg, or similar structure to removably connect a wheel platform, one embodiment of which is shown in FIG. 2. The wheel platform 60 consists of a main body 76 wherein the main body is defined by one substantially straight edge 72 and a curved edge 74. As shown in the embodiment depicted in FIG. 2, the shape of the wheel platform 60 is substantially triangular, with the substantially straight edge 72 defining the base of the triangle and the curved edge defining the remaining two triangle line segments. Consequently, in the embodiment shown in FIG. 2, the curved edge 74 incorporates an turn of approximately 90 degrees in substantially the mid-section of the curved edge 74. As shown in FIG. 2, in one embodiment, the turn occurs at or near the point of height h of the creeper body 76.

While a substantially triangular shape for the platform body 76 has been depicted in FIG. 2, other shapes are envisioned. For example, while the curved edge 74 is shown to be a single curved segment in FIG. 2, in another embodiment, the curved edge 74 comprises individual sub-segments forming a polygonal shape defined by straight line segments wherein the line segments join together at sharp corners.

Traversing at or near the midline h of the main body 76 are two apertures 62, 64. In one embodiment, the first aperture 62 is designated to receive the wheel assembly described in FIG. 3A. The second aperture 64 is designed to connect to the platform main body 10 shown in FIG. 1. In the embodiment shown in FIG. 2, the first aperture 62 and the second aperture 64 have substantially equivalent radii. Further, the frame receiving aperture 64 approximates the radius of the apertures 30, 36 shown in FIG. 1. Consequently, it is possible to use a joining member of a consistent radius to join the platform 60 to either subportion 12, 14 of the main device frame 10.

The wheel platform 60 incorporates additional apertures, such as the secondary apertures 66 found on the sides of the platform 60. In the embodiment shown in FIG. 2, the secondary apertures 66 feature the same radius as wheel assembly 62 receiving aperture, or the frame receiving aperture 64. Consequently, it is possible to attach either the wheel assembly, or the frame to either one of the secondary apertures 66. In one configuration, multiple wheel assemblies are attached to both the wheel assembly receiving aperture as well as the secondary apertures 66.

Beyond the secondary apertures 66, the wheel platform 60 incorporates tertiary apertures 68 and quandary apertures 70. As compared with the secondary apertures 66, each subsequent class of apertures incorporates a smaller radius. Consequently, the tertiary and quandary apertures cannot be used interchangeably with the secondary apertures 66 and the wheel assembly receiving apertures 62 and the frame receiving aperture 64.

Figure 3A:
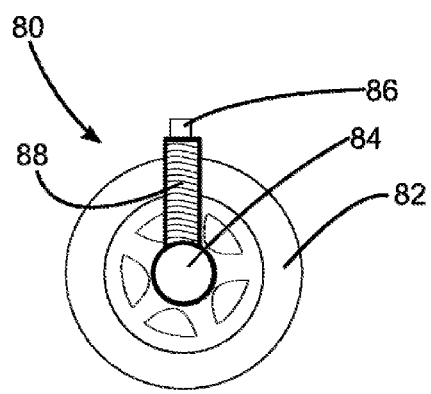
FIGS. 3A-B depict the wheel assembly of one embodiment of the invention.

The wheel platform 60 incorporates the wheel assembly receiving apertures 62. One embodiment of the wheel assembly is depicted in FIG. 3A. As shown therein, the wheel assembly 80 incorporates an outer wheel 82. A wheel spinning pin 84 traverses the mid-point of the wheel 82. The spinning pin 84 is in turn mounted on the wheel retension bracket 88. The bracket 88, in turn ends in a wheel assembly joining pin 86.

In the embodiment shown in FIGS. 2 and 3A, the joining pin 86 is removably received in the wheel assembly receiving aperture 62. While FIG. 3a depicts the wheel as a caster, other wheels are be used in other embodiments. For example, rollers are retained by the retention bracket depicted in FIG. 3A in a different embodiment.

The type of wheel 82 that is used in the wheel assembly 80 is chosen in response to the environment in which the wheel 82 will be used. For example, in some environments, large casters made of hard rubber are employed. Such casters provide for insulation and prevent the buildup of static energy during the work on the vehicle. While desirable in some situations, such rubber wheels 82 are prone to deterioration in other environments. As such, wheels 82 are made from resilient metal or non-reactive polymers in other embodiments. Further, wheels are selected so as to be easiest to clean given the contaminants that are expected in a given work environment.

Given the modular nature of the wheel assembly 80, for a given wheel platform 60, multiple types and sizes of wheels are used and kept on an as-needed basis.

Finally, in other embodiments, not shown, the wheel assembly does not incorporate any wheel 82. Instead, the wheel assembly 80 uses a support member in place of the wheel wherein the support member carries the weight of the assembled frame in place of the wheel. In order to facilitate movement, the support member includes a slick surface, or a gliding surface, such as skis.

In the embodiment shown in FIG. 3A, the retention bracket 88 does not encapsulate the wheel, but instead is designed to keep the spinning pin 84 in place. In other embodiments, not shown, the retention bracket covers a portion of the wheel, thereby protecting the wheel from drips and other contamination.

Further, while not shown in FIG. 3A, the retention bracket 88 includes a brake so as to interfere with the movement of the wheel 82, keeping same in place when the operator of the device chooses to deploy same. In some embodiments of the invention, only one wheel assembly 80 deployed in conjunction with the creeper incorporates a braking mechanism.

In some embodiments of the invention, the wheel assembly joining pin 86 is adjustable in height.

Figure 3B:
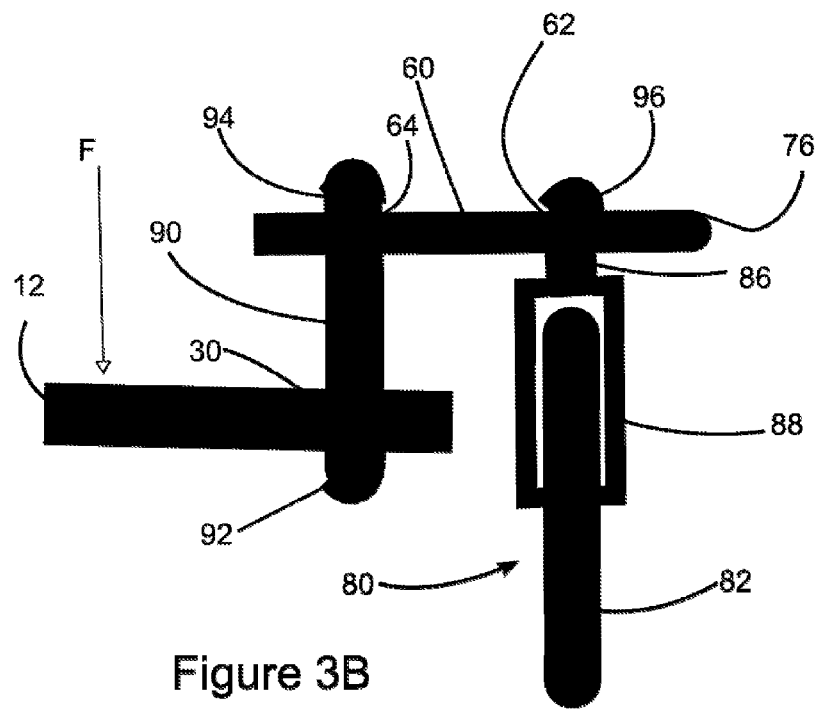

A combination of a frame subportion, wheel platform, and wheel assembly is depicted in profile in FIG. 3B. As shown in FIG. 3B, a visible part of the first frame subportion 12, incorporates an aperture 30. While FIG. 3B shows a part of the first subportion 12, the same arrangement would be used with the second subportion 14.

Transversing the aperture 30 is a frame to wheel platform connection rod 90. This connection rod 90 extends through the width of the first frame subportion 12. Extending beyond the outer wall of the first frame subportion 12, the connection rod 90 is capped by a first fastener 92. The fastener 92 shown in FIG. 3B is a threaded cap. However, other fasteners are contemplated, such as a hex nut, wing nut, a locking pin or pins, and other possible fasteners.

While one end of the connection rod 90 is removably received by the fastener 92, the opposing end of the connection rod 90 passes through the wheel platform 60. The connection rod 90 extends through the width of the wheel platform 60 main body 76 at the wheel platform frame receiving aperture 64. As was discussed in the description of FIG. 2, the rod 90 is capable of being received by secondary apertures 66 inasmuch as the secondary apertures 66 have substantially the same diameter as the frame platform receiving aperture 64.

The part of the rod 90 which extends beyond the horizontal plane formed by the wheel platform 60 main body 76 is removably locked in place by rod 90 second fastener 94. This second fastener 94 is also depicted as a threaded cap received by the end of the rod 90. Analogous to the first fastener 92, the second fastener 94 comprises any possible type of fastener.

While in the embodiment shown in FIG. 3B, the connection rod 90 is removably connected to both the frame subportion 12 and the wheel platform 60, the rod 90 are integrally molded with either element in other embodiments. For example, in one embodiment, the wheel platform 60 does not incorporate a frame receiving aperture 64. Instead, in the place of the aperture 64 the wheel platform incorporates an integrally molded frame receiving rod 90.

In the embodiment shown in FIG. 3B, the connection rod 90 has a substantially equal diameter throughout the length of the rod 90. In other embodiments, the connection rod 90 features a variances in its diameter.

The wheel platform main body 76 is consequently removably attached to the frame subportion 12 through the combination of the rod 90 and the rod fasteners 92, 94. In turn, the wheel assembly 80 is removably attached to the wheel platform 60 by the removable placement of the joining pin 86 through the wheel assembly receiving aperture 62. The joining pin 86 is kept in place through the removable fastening of wheel assembly fastener 96. As was the case with the previously-described fasteners 92, 94, the wheel assembly fastener 96 may comprise any suitable fastener.

In alternative embodiments, the joining pin 86 is not fastened in place with a mechanical fastener. Instead, the joining pin 86 is kept in place by the force F which is applied to the surface of the first frame subportion 12 by a load placed on top of the device during use of the device. In other embodiments, in conjunction with this force, the locking pin 86 incorporates a magnetic joining means.

The wheel 82 is attached to the retension bracket 88, and a joining pin 86 extends from the retention bracket 88 away from the wheel 82 towards the main body 76 of the wheel platform 60. As such, the wheel 82 is attached to both the wheel platform 60 and in turn to the frame subportion 12.

While only one wheel 82 is shown as attached in FIG. 3B, a complete device assembly would include at least four wheels attached to the first frame subportion and the second frame subportion so as to balance the device.

As shown in the profile view of FIG. 3B, the wheel 82 extends above the horizontal plane defined by the frame subportion 12, consequently facilitating the use of large wheels without the necessity of lifting the frame subporiton 12 to the same height as the wheels.

Further, inasmuch as separate wheel assemblies are attached to the frame subportions, different wheels may be combined in a single creeper device. For example, in instances where the creeper is used on an uneven surface, one wheel may be larger than the remaining wheels so as to prevent the creeper from rolling around during use.

Figure 4:
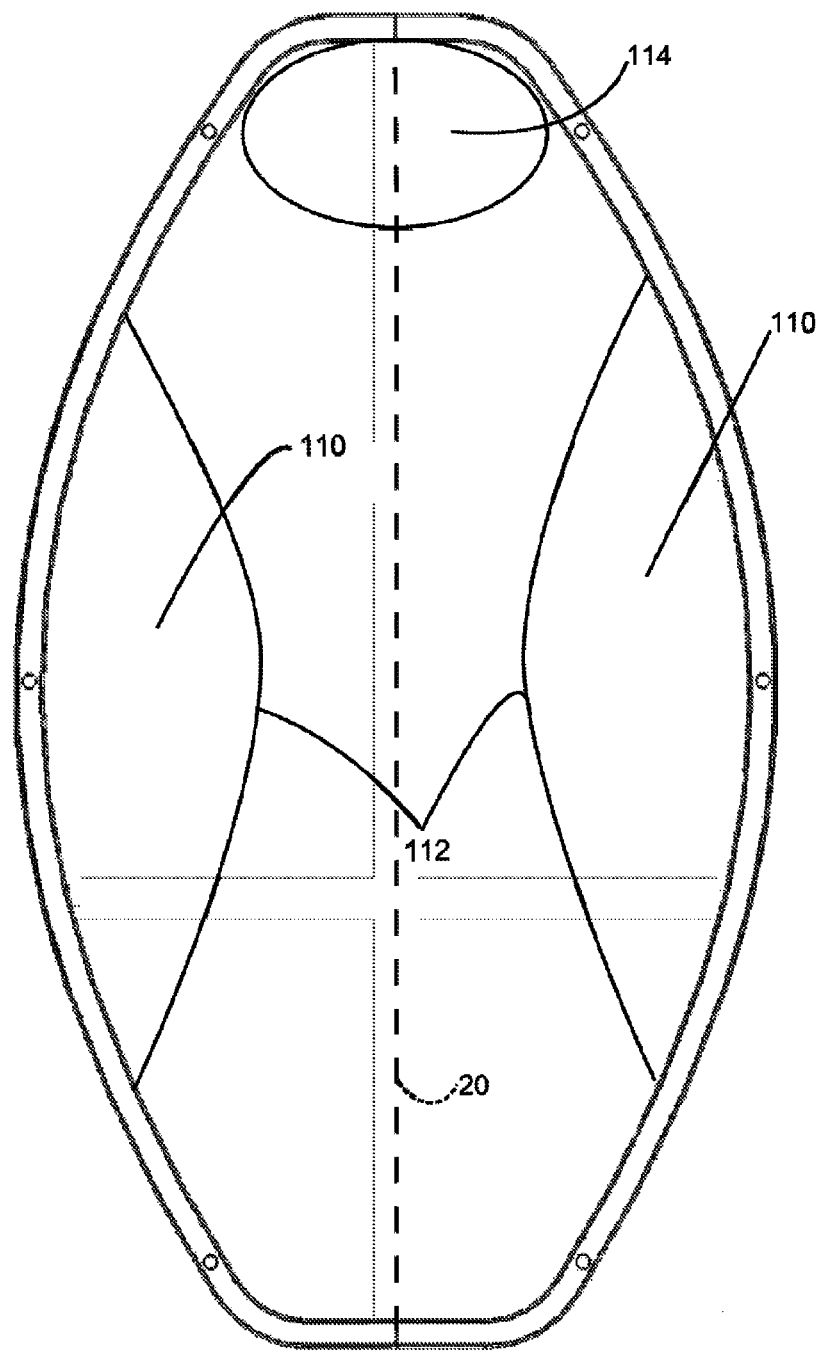
FIG. 4 depicts the cushion of one embodiment of the invention.

As shown in FIG. 4, the assembled device 10 also incorporates a cushioning layer. The cushioning layer does not obscure any of the frame apertures.

In order to provide support for the user of the device, the cushioning layer is defined by two lateral cushions 110. The lateral cushions, in turn comprise a padding material, such as reversibly deformable foam, and include an outer boundary 112. The outer boundary is a sloping barrier thereby directing the user of the device away from the outer sides of the device.

Further, the cushioning layer shown in FIG. 4 includes a head cushion at one end of the device. In one embodiment of the invention, the head cushion is reversibly attached to the cushioning layer through means such as snaps or hook and pile layers. In other embodiments, the head cushion is integrally molded into the cushioning layer.

In the embodiment shown in FIG. 4, the cushioning layer includes a transverse fold line 20 running through the middle of the cushioning layer. In embodiments where the head cushion 114 is integrally molded into the cushioning layer, the fold line 20 transverses the head cushion. In embodiments where the head cushion is not integrally molded into the cushioning layer, the head cushion 114 may be free of the fold line 20.

The cushioning layer comprises a resilient material which does not absorb various vehicular fluids, but instead forces them to collect on the surface of the cushioning layer.

It is to be understood that the above description is intended to be illustrative, and not restrictive. For example, the above-described embodiments (and/or aspects thereof) may be used in combination with each other. In addition many modifications may be made to adapt a particular situation or material to the teachings of the invention without departing from tits scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure The embodiment of the invention in which an exclusive property or privilege is claimed is defined as follows:

1. A vehicle chassis access platform, the platform comprising:
   a frame assembly comprising
      a first subportion,
      a second subportion,
      wherein the first subportion and the second subportion are removably joined together to form the frame assembly; wherein said frame comprises apertures;
   at least three wheel assemblies wherein each wheel assembly comprises
      a wheel platform wherein said wheel platform comprises a main body having a straight edge and a curved edge with apertures defined along the curved edge;
      a wheel;
      a wheel retention bracket; wherein each wheel is connected to a retention bracket and said retention bracket is removably connected to a corresponding wheel platform;
   wherein each wheel assembly is removably attached to the frame wherein said assembly is removably attached by insertion of joining pins through the wheel platform main body apertures and frame apertures; and
   a cushion layer removably attached to the frame assembly; wherein the wheel extends above the horizontal plane defined by the frame assembly.

2. The device as recited in claim 1, wherein the frame assembly and the cushioning layer incorporate a fold line and further define foldable hinges.

3. The device as recited in claim 1 wherein the attached wheel platform incorporates a wheel having a wheel vertical height and wherein the wheel vertical height is larger than the clearance between the frame and a surface on which said wheel rests.

4. The device as recited in claim 3 wherein at least two the wheel vertical heights of the three wheels is different.

5. The device as recited in claim 1 wherein the cushioning layer incorporates a two lateral cushions.

6. The device as recited in claim 1 wherein at least two of the wheel assemblies removably attached to the frame incorporate different wheels.

7. The device as recited in claim 1, wherein at least one wheel platform features two or more points at which the wheel retention brackets may be removably joined to the wheel platform.

8. The device as recited in claim 1 wherein the wheel platform is substantially rectangular.

9. The device as recited in claim 1 wherein the wheel platform defines at least three apertures.

10. The device as recited in claim 9 wherein the wheel platform defines twelve apertures.

11. A vehicle chassis access platform, the platform comprising:
   a substantially oval frame assembly comprising
      a first subportion,
      a second subportion,
      wherein the first subportion and the second subportion are removably joined together to form the frame assembly; wherein said frame comprises apertures;
   at least three wheel assemblies wherein each wheel assembly comprises
      a wheel platform; wherein said wheel platform comprises a main body having a straight edge and a curved edge with apertures defined along the curved edge;
      a wheel;
      a wheel retention bracket; wherein each wheel is connected to a retention bracket and said retention bracket is removably connected to a corresponding wheel platform;
   wherein each wheel assembly is removably attached to the frame wherein said assembly is removably attached by insertion of joining pins through the wheel platform main body apertures and frame apertures; and
   a cushion layer removably attached to the frame assembly wherein the wheel extends above the horizontal plane defined by the frame assembly.

12. A vehicle chassis access platform, the platform comprising:
   a substantially frame assembly comprising
      a first subportion,
      a second subportion,
      wherein the first subportion and the second subportion are integrally molded together to form the frame assembly; wherein said frame comprises apertures;
   at least three wheel assemblies wherein each wheel assembly comprises
      a wheel platform; wherein said wheel platform comprises a main body having a straight edge and a curved edge with apertures defined along the curved edge;
      a wheel;
      a wheel retention bracket; wherein each wheel is connected to a retention bracket and said retention bracket is removably connected to a corresponding wheel platform;
   wherein each wheel assembly is removably attached to the frame wherein said assembly is removably attached by insertion of joining pins through the wheel platform main body apertures and frame apertures; and
   a cushion layer removably attached to the frame assembly wherein the wheel extends above the horizontal plane defined by the frame assembly.

* * * * *